June 10, 1952 C. F. WALLACE ET AL 2,599,956
ABSOLUTE PRESSURE CONTROLLING APPARATUS
Filed June 8, 1946
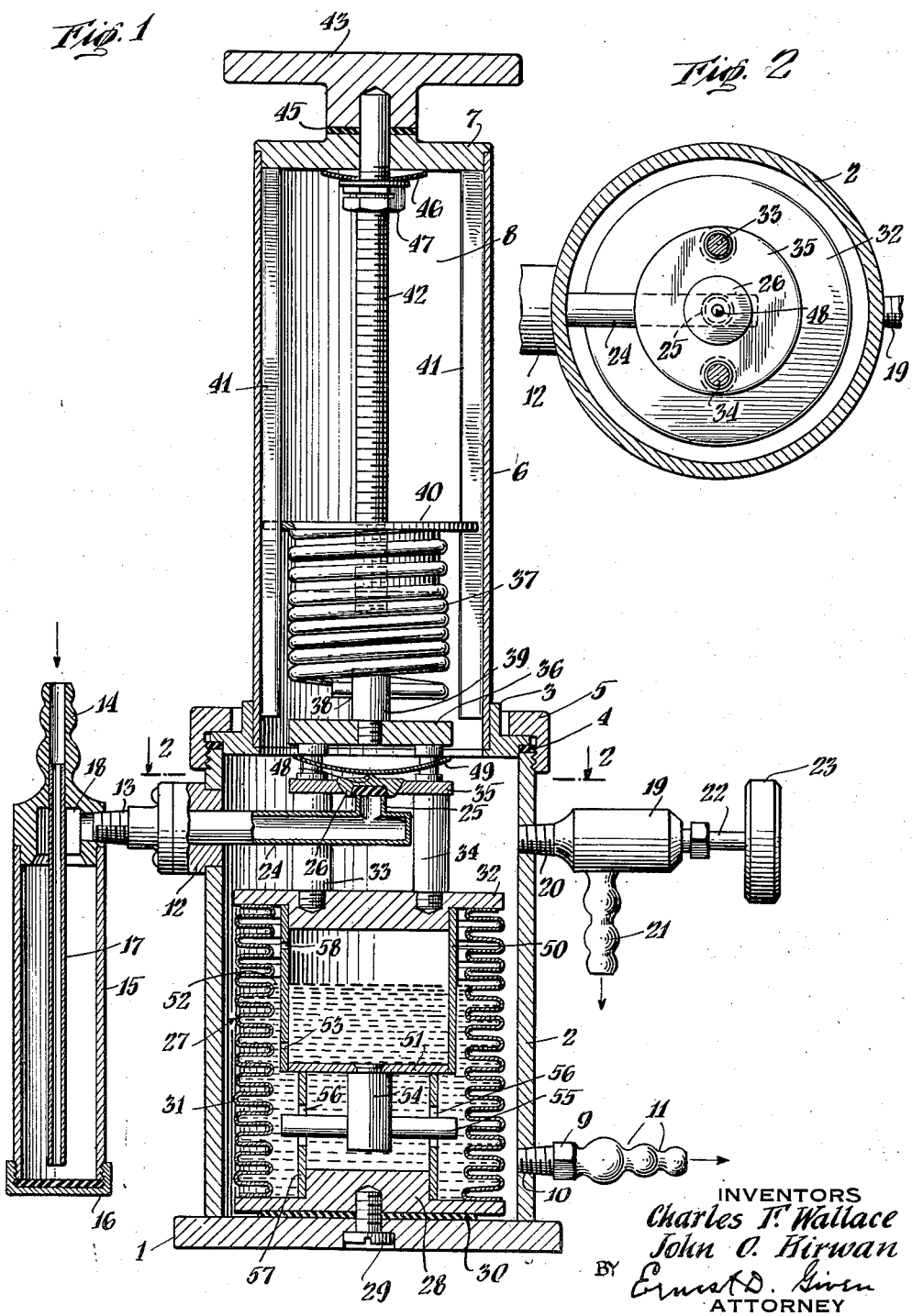
INVENTORS
Charles F. Wallace
John O. Kirwan
BY Ernest D. Given
ATTORNEY Patented June 10, 1952

2,599,956

UNITED STATES PATENT OFFICE 2,599,956

ABSOLUTE PRESSURE CONTROLLING APPARATUS

Charles F. Wallace, Westfield, and John O. Kirwan, Bloomfield, N. J., assignors to Wallace & Tiernan Products, Inc., Belleville, N. J., a corporation of New Jersey Application June 8, 1946, Serial No. 675,360

11 Claims. (Cl. 50—23)

Our present invention relates to absolute pressure controlling apparatus and more particularly to apparatus such as may have special utility in or around a laboratory or elsewhere for controlling and maintaining an absolute pressure, of predetermined adjustable magnitude whether sub-atmospheric or super-atmospheric, in a desired, relatively narrow range for the carrying on of other work which may be desired to be done at some such predetermined pressure.

In the past it has been necessary to use relatively crude apparatus for establishing and maintaining desired pressures, no commercial means being available by which desired magnitudes of absolute pressure could be established and maintained within narrow limits for the carrying on of certain operations which are delicately sensitive to pressure variations. The amount of absolute pressure, for example of vacuum, has been dependent in most instances upon the operation of a vacuum pump, and has been variable due to the variable output of that pump. Positive pressures (in respect to that of the atmosphere) have been determined within some relatively wide limits by pressure reducing valve mechanisms which are at best somewhat inaccurate in their operation.

Among the objects of the present invention are to provide means by which an absolute pressure, whether above or below atmospheric, may be maintained within extremely narrow limits, at adjustably pre-determinable magnitudes, and independent of the pressure or vacuum afforded by the pump used in conjunction with the system and preferably also independent of barometric pressure changes and of temperature changes. The apparatus, according to the present invention, provides for the establishing and maintenance of desired absolute pressures, as aforesaid, within limits in the order of magnitude of 0.005 inches of mercury from a predetermined control point within the capacity of the pump or source of pressure or vacuum used.

Other and more detailed objects of the invention are to provide apparatus of the character set forth, wherein the operation and construction is relatively simple in character, substantially fool-proof within reasonable limits, operates without the use of an external source of power other than that derived from the pressure or vacuum used in the case and which will fulfill the needs of the art as set forth hereinabove from all practical points of view.

Other and more detailed objects of the present invention will become apparent from the following specification and appended claims when considered in connection with the accompanying drawings in which:

Figure 1 is a view principally in central vertical section, illustrating a preferred embodiment of the invention; and Fig. 2 is a view in horizontal section taken substantially on the line 2—2 of Fig. 1.

Basically, the present invention is embodied in a construction wherein there are means providing a substantially closed chamber inside which the pressure is maintained at the magnitude at which it is desired to maintain the apparatus wherein the pressure is to be controlled. A fluid pressure conducting means communicates from the inside of the chamber to such apparatus. Inasmuch as the apparatus of the present invention can be applied to any apparatus, all that is illustrated in the accompanying drawings and which will be specifically described herein, comprises the chamber, the means for maintaining a desired absolute pressure therein, and a hose connection by which such pressure is conducted to or from the apparatus with which the present invention is to be used, so as to maintain the absolute pressure therein the same as in the chamber of the present invention. Associated with this chamber are two other pressure ducts, one adapted for connection to a source of higher pressure than that to be maintained, the other to a source of lower pressure. Means are provided for controlling a flow of pressure fluid through the chamber of the present invention from the source of higher pressure to the source of lower pressure. All pressures herein referred to are absolute pressures rather than related to atmospheric pressure, unless otherwise specifically stated.

The apparatus of our present invention operates on the principle that as the inside of the chamber is connected through an open but constricted passage to a source of lower pressure, and opened when necessary to increase the pressure in the chamber from a source of fluid at a higher pressure than is desired, the pressure in the chamber may be maintained at a definite predetermined value. Means are provided, therefore, to control the flow from a source of higher pressure into the chamber, the flow opening from the chamber to the source of lower pressure being continuously open, but being a constricted passage.

When there is referred to herein "a source of pressure," it is to be understood that this is intended to mean either a pump providing such pressure or a chamber, or other means wherein such pressure exists. For example, the atmosphere may and is considered as "a source of pressure" at atmospheric pressure. A positive pressure pump or a chamber of compressed gas at a relatively high pressure may be a source of pressure of high magnitude. A vacuum pump and/or a chamber connected therewith and evacuated to a desired extent may be a source of low pressure. These terms are to be construed in this manner throughout the specification and claims.

As a means for controlling the flow from the high pressure source into the chamber, there is preferably used barometric apparatus, i. e., barometric type means subject to the pressure in the chamber and having associated therewith some means for actuating a valve. While there is particularly illustrated herein a mechanical means for valve actuation which is mechanically substantially directly connected to a flexible evacuated diaphragm or flexible bellows, it is contemplated that other types of barometric means with suitable interconnecting means might be used and be considered the equivalent of the means hereinafter specifically to be described. There is also a means provided by which the pressure to be maintained may be manually varied or adjusted to any predetermined magnitude or control point within the range of the apparatus, by means accessible from the outside of the apparatus. In this case, such means takes the form of a screw for controlling the tension of a spring.

Turning now to the accompanying drawings, there is provided a chamber made up of a base 1, and a substantially cylindrical side wall member 2, which may be suitably secured as by welding or otherwise to the base 1 in any airtight manner or may be formed integral therewith. At its upper end, the cylindrical side wall member 2 carries an annular member 3, resting thereon through the intermediation of gasket means 4, a suitable annular nut 5, engaging above the outer flange portion of the member 3 and threaded onto the upper end of the side wall member 2, as shown. The member 3 has suitably secured thereto, as by welding or otherwise, a further cylindrical member 6, which carries at its upper end a head 7, the connections between the members 3 and 6, on the one hand, and the member 6 and the head 7, on the other, being of any suitable type and being air-tight. The parts just described collectively define a central chamber space 8, within which the pressure is maintained at a desired level by the means more particularly described hereinafter.

Means are provided for communicating between the space 8 of the chamber and an apparatus in which the pressure is to be controlled and maintained, such means in the present instance comprising a hose connection member 9, which may be threaded through the side wall member 2, as shown at 10, or associated therewith in any other desired manner, and which is provided with annular corrugations as shown at 11, for connection to a suitable flexible tube (not shown).

Means are provided for the transmission of pressure to the inside of the chamber from a pressure source of higher magnitude than the pressure to be maintained. For this purpose, the side wall member 2 of the chamber may be provided with a connecting fitting 12, suitably secured therein in any desired air-tight manner and connected to a fitting 13, which in turn is connected to a hose connection member 14. Intermediate the passages through the members 14 and 13, the incoming pressure fluid may be filtered to remove impurities, and/or in the case of gaseous pressure, may, if desired, be dried by chemically or physically removing moisture therefrom in any way known in the art. As shown, the member 14 is provided with a hollow cylindrical extension 15, having a closed lower end as shown at 16, and with a tube 17 terminating short of this lower end, through which pressure fluid flowing into the member 14 must pass to a point adjacent to the lower end 16, thence up between the cylindrical extension 15 and the tube 17 to a counterbore 18, formed in the member 14 and communicating with a passage (not shown) through the fittings 13 and 12. This space within the extension 15 may, if desired, be filled or partially filled with any one or more types of filtering media or means, so as to prevent the passage of solid matter into the inside of apparatus of the present invention on the one hand, and/or in the event that a gaseous pressure fluid is being controlled, by the use of some means such, for example, as calcium chloride, for removing traces of moisture from the incoming gas.

While the apparatus of the present invention may and probably usually will be used with air for controlling air pressures, it is obvious that it could, without substantial change, be used for controlling the pressure of any other fluids, such as some inert gas or gases such as carbon dioxide or nitrogen, or for that matter many gases known in the art. In the use of the apparatus with carbon dioxide or nitrogen, and irrespective of whether the apparatus is to be used for maintaining a positive or a negative pressure, the fitting 14 would be connected with a supply of such gas at a pressure higher than that desired to be maintained in the final apparatus wherein pressure is to be controlled.

Means are provided for the flow of pressure from the inside of the chamber space 8, aforesaid, to a source of lower pressure. For this purpose, there is provided a constricted, but constantly open passage included in a means generally indicated at 19, which is threaded through the wall 2, as shown at 20, and is provided with a hose connection fitting 21, for use when and if necessary. The means 19 may be formed internally in a manner not particularly illustrated herein, as a needle valve as will be well known to those skilled in the art, the valve being controlled by a stem 22, carrying a suitable handle 23.

The connecting fitting 12 has secured therein a duct 24, extending into the inside of the chamber, aforesaid, and provided with an upwardly directed orifice forming portion 25 substantially central of the chamber, the duct being otherwise closed. Associated with the orifice-forming portion 25 is a valve means generally indicated at 26, which is arranged to cooperate with the orifice for throttling the flow therethrough. Barometric means are provided, as hereinafter described in detail, for operating the valve 26, so as to open the valve slightly to permit pressure to flow from the fitting 14 through the passages described and the duct 24, and from the orifice into the inside space 8 of the chamber. When pressure tends to build up too much in the space 8, the valve 26 is partly or wholly closed, whereupon the continued bleeding out of pressure through the means 19 serves to cut down the pressure to a desired point. Any suitable means may be employed, preferably barometric in nature and subject to the pressure within the space 8, for controlling the valve 26, the one shown being a preferred embodiment of such means.

As shown, there is provided a collapsible evacuated member, in the present instance a collapsible bellows apparatus generally indicated at 27. This bellows apparatus is provided with a fixed base 28, which is secured to the base 1 in any suitable manner as by one or more screws 29, leakage of air into or out of the chamber space 8 being prevented by a suitable packing means 30. The lower end of the corrugated side wall portion 31, of the flexible bellows 27, is secured to the base 28 in any suitable air-tight manner, as by welding, etc. The other or upper end of the bellows 31, which is the movable portion or part thereof, is fixed to a movable head 32. It will be understood from the above that the outside of the bellows 27 is exposed to the pressure in the space 8 so that the movable part 32 thereof will respond in its general vertical position to the pressure within the space 8. Valve supporting means are provided for transmitting the motion of the movable head 32 of the bellows to the valve 26. For this purpose, a pair of standards 33 and 34 are rigidly secured to the head 32 and carry adjacent to their upper ends two vertically spaced cross members 35 and 36, both these members being rigidly connected to the standards 33 and 34 by suitable means, as generally illustrated. The valve 26 is carried, as more particularly described hereinafter, by the cross member 35.

In order to provide for an adjustment of the pressure to be maintained within the space 8 and hence in any apparatus associated with the apparatus of the present invention, a resilient means is provided, effective to oppose movement of the bellows in one direction. In the present instance, this means comprises a helical tension spring 37, the lower end of which is preferably rigidly connected, as shown at 38, to a stud 39, which is in turn rigidly secured in the cross member 36. The upper end of the spring is connected to a cross head 40, which is arranged for vertical sliding movement within the cylindrical extension 6, the latter being provided with one or more longitudinally extending ribs, as shown at 41, which extend into suitable slots in the cross head 40 to guide it and prevent rotative movement thereof. The cross head 40 is threaded upon a long screw 42 which extends through the head 7 and has an adjusting handle 43 suitably secured to its upper end. Suitable means are provided for preventing the leakage of pressure to or from the space 8 through the aperture in the head 7, through which the upper end portion of the screw 42 passes. Such means in the present instance, comprising packing ring 45, between the handle 43 and a part of the upper surface of the head 7, and a spring washer 46, held in place below the head 7 by a suitable lock nut means 47 threaded on the screw 42.

From the above, it will be seen that the hand wheel 43 may be rotated to rotate the screw 42, which in turn will raise or lower the cross head 40, depending upon the direction of rotation, so as to increase or decrease the tension of spring 37, which exerts an upward force upon the bellows 27. In practice, the adjustment of the hand wheel 43 is effective to vary the pressure to be maintained by the device within quite wide limits, for example from the minimum pressure available by the device, approaching zero absolute, up to approximately atmospheric pressure, or in another actual model of the invention, from about a plus three inches to about plus sixty inches absolute pressure (referring to inches of mercury). It will be understood that these example pressures here given are not in any sense limiting upon the invention, but are merely illustrative of actual embodiments of the invention which have been made.

Means are provided for supporting the valve 26 in the cross member 35 or valve supporting means in a self-aligning manner, i. e., so that once the valve has been moved down to a position to engage the orifice forming means 25, the valve will be caused to assume a predetermined position by this contact which will give proper closing of the orifice. Thereafter the valve will maintain itself at this position, the means provided being such as to permit this self-aligning of the valve without bringing pressure to bear to cause a change in the alignment once made. For this purpose, the contacting surfaces of both the valve and its seat in the cross piece 35 are formed as complementary semi-spherical surfaces, the center of the spheres being at the tip 48 of an abutment on the upper side of the valve 26. This tip 48 is adapted to contact the under surface of a leaf spring 49, the ends of which are perforated or bifurcated to engage around upper reduced portions of the standards or posts 33 and 34, as shown. Inasmuch as the tip 48 is the center of the sphere forming the outside supporting portion of the valve, this point will not vary in position for any self-aligned position of the valve 26, in respect to its supporting cross member 35. The self-aligned position of the valve will thus be maintained independently of its contact with the spring 49, so that in practice there will be no work incident to realigning involved in moving the valve to and from a closed position, which provides a friction-free type of valve, while at the same time providing for the proper alginment thereof.

Means are provided for dampening the movements of the flexible bellows and hence of the valve 26. For this purpose it is desired that the means provided be substantially friction-free while having a dash pot effect, so as to dampen vibrations while permitting frictionless motion. For this purpose, the underside of the head 32 of the bellows is provided with a liquid displacing means 50, formed as a hollow cylindrical member having a closed lower end 51. The means 50 is suitably rigidly secured in any desired manner to a cylindrical boss on the under surface of the head 32 and has an outside diameter sufficiently less than the inside diameter of the corrugated side wall 31, so as to be out of contact therewith throughout any reasonable movement of the parts. The space within the bellows apparatus 27 is partly filled with a suitable liquid, such as oil, up to a level shown at 52, this amount being more or less critical as hereinafter set forth, but from the present point of view serving merely as a dash pot liquid for cooperation with the liquid displacing means 50. At least one hole is provided, as shown at 53, through the side wall of the means 50, above (or alternatively through) the bottom wall 51 thereof, for the flow of liquid between the inside and the outside of the means 50. Thus there is provided a dash pot means which will dampen vibrations of the movable parts of the apparatus without preventing such movement as will bring the parts to an equilibrium upon changes of conditions from time to time.

Means are provided for limiting the movements of the diaphragm in both directions and thus for limiting the movement of the valve 26. For this purpose, the closed end 51 of the means 50 is provided with a stud 54 having a cross bar 55 secured therein which passes loosely through vertically and laterally enlarged openings 56, formed in a cylindrical member 57 which is secured to the base 28. As the parts 32, 50, 51, 54 and 55 are all rigid with one another, it will be seen that the upper and lower ends of the openings 56 will determine the upper and lower limits of movement of the movable part of the bellows. The lower limit of such movement may be further determined by the upper end of the member 57, against which the bottom 51 may seat or contact at the lower end of the desired movement of the movable part of the bellows. This limit is preferably chosen at about the point at which the valve 26 will be seated upon the associated orifice.

However, in order to compensate for slight irregularities in the bellows movement or in the dimensions of parts, it may be desired to permit a slight overthrow in the bellows movement beyond that point at which the valve 26 will be seated so as fully to close the orifice. This may be permitted by the flexing of the spring 49 with the valve 26 stationary thus permitting the head 32, the posts 33 and 34, and other parts fixed thereto to move without moving the valve or deforming any parts normally intended to retain their shape. Upon reverse movement, the valve will again be supported in its spherical seat in a self-aligned position. This condition may also be attained when the hand wheel 43 is loosened to an excessive amount, permitting the collapse of the bellows apparatus to its smallest dimensions.

Under normal circumstances, the bellows apparatus acts as a substantially evacuated means corresponding in its general function to the aneroid capsules used in aneroid type barometers. As it is exposed to the pressure within the space 8, it will react to that pressure as an aneroid capsule would react and hence will be responsive to absolute pressures rather than to differences between such absolute pressures and atmospheric pressure. Thus the apparatus is independent of variations in pressure, incident to changes in pressure of the source of positive or negative pressure, as the case may be, and further is independent of variations in the barometric pressure of the external atmosphere.

Means are preferably further provided for compensating for temperature. For this purpose two alternative arrangements are contemplated. The first and simplest of such arrangements is to provide as close to an absolute vacuum within the bellows 27 as possible, and to use as the material for the spring 37 so-called isoelastic material, i. e., material having a practically zero temperature co-efficient. Certain of the other parts, including, for example, the posts 33 and 34, may if desired be formed of this same or some similar material. Under these circumstances, the opening and closing of the valve 26 will be substantially independent of temperature changes.

Another and somewhat cheaper construction, which may in many instances be preferred, is to use an ordinary music wire spring as the spring 37, to construct other parts of ordinary materials as brass or bronze and to compensate for temperature variations in this spring and other parts by providing a small amount of air or some inert gas inside the space within the bellows apparatus above the liquid therein. It is preferred usually to use some inert and non-oxidizing gas for this purpose, several of which are known. When such an expedient is resorted to, it is usually preferred to provide one or more passages or holes, as shown at 58, in the member 50, between the inside and outside thereof for the equalization of gas pressures on the two sides. In this connection, it has been found that it is desirable to provide a certain predetermined ratio of gas pressure to gas volume, in respect to the expansion characteristics of the parts. This ratio can be achieved by putting in the right amount of oil so as to afford a desired gas volume within the bellows under given conditions. Inasmuch as the actual figures for the values of volume, pressure, etc., may be determined by reasonable experience and are not a part of the present invention, they are not given herein. In any event, it has been found that such a combination will effect substantial temperature compensation over a reasonable working range of temperatures and pressures for the device.

There is shown and described herein but one principal embodiment of the invention and certain variants of portions thereof, and the principles upon which the invention operates are clearly set forth. We do not wish to be limited, however, except by the scope of the appended claims, which are to be construed validly as broadly as the state of the prior art permits.

What is claimed is:

1. Absolute pressure controlling apparatus, comprising means forming a substantially closed chamber for containing fluid pressure, the magnitude of which is to be controlled, fluid pressure conducting means for connection from the inside of said chamber to apparatus wherein pressure is to be controlled, fluid pressure conducting means for connection with a source of fluid pressure of greater absolute magnitude than the pressure to be controlled, a duct connected to the last named means within said chamber and having an orifice therein opening into the interior of said chamber, substantially friction-free valve means associated with said orifice for throttling the flow of fluid pressure therethrough, a barometric, absolute pressure responsive means arranged to be influenced by the absolute fluid pressure within said chamber, means responsive to said barometric means for controlling the throttling of the flow through said orifice by said valve, and a constantly open, constricted fluid pressure conducting means from the inside of said chamber for uninterrupted connection with a source of fluid pressure of less absolute magnitude than the pressure to be controlled.

2. Absolute pressure controlling apparatus, comprising means forming a substantially closed chamber for containing fluid pressure, the magnitude of which is to be controlled, fluid pressure conducting means for connection from the inside of said chamber to apparatus wherein pressure is to be controlled, fluid pressure conducting means for connection with a source of fluid pressure of greater absolute magnitude than the pressure to be controlled, a duct connected to the last named means within said chamber and having an orifice therein opening into the interior of said chamber, substantially friction-free valve means associated with said orifice for throttling the flow therethrough, a substantially evacuated flexible bellows subject externally to the absolute fluid pressure within said chamber and having a fixed part and a movable part, resilient means opposing the movement of the novable part of said flexible bellows in one direction and connected to the movable part of said flexible bellows, means responsive to the movement of said movable part of said flexible bellows for controlling the throttling of said orifice by said valve means, and a constantly open, constricted fluid pressure conducting means from the interior of said chamber for uninterrupted connection with a source of fluid pressure of less absolute magnitude than the pressure to be controlled.

3. Absolute pressure controlling apparatus according to claim 2, comprising in addition means for manually adjustably varying the pressure at which flexing of said resilient means takes place to vary the absolute pressure being controlled and maintained by the apparatus.

4. Absolute pressure controlling apparatus in accordance with claim 2, wherein said valve means comprises a valve operating means rigidly connected with the movable part of said flexible bellows, a valve free for movement in respect to said operating means, and resilient means interposed between said operating means and said valve, the valve and its operating means aforesaid being so constructed and arranged as to permit self-aligning movement of said valve in respect to the orifice with which it is associated and in respect to said operating means, and further that positive movement of said operating means in a direction to move said valve toward said orifice when the valve is seated on said orifice may be accommodated by relative movement between said valve and said operating means against the tension of said resilient means.

5. Absolute pressure controlling apparatus, comprising means forming a substantially closed chamber for containing fluid pressure, the magnitude of which is to be controlled, fluid pressure conducting means for connection from the inside of said chamber to apparatus wherein pressure is to be controlled, fluid pressure conducting means for connection with a source of fluid pressure of greater absolute magnitude than the pressure to be controlled, a duct connected to the last named means within said chamber and having an orifice therein opening into the interior of said chamber, substantially friction-free valve means associated with said orifice for throttling the flow therethrough, a substantially evacuated flexible bellows subject externally to the absolute fluid pressure within said chamber and having a lower fixed part and an upper movable part, liquid filling a part of the space within said flexible bellows, solid liquid-displacing means secured to the inside of the movable part of the bellows and extending into the liquid therein for dampening the movements of the movable part of said bellows, means responsive to the movement of said movable part of said flexible bellows for controlling the throttling of said orifice by said valve means, and a constantly open, constricted fluid pressure conducting means from the interior of said chamber for uninterrupted connection with a source of fluid pressure of less absolute magnitude than the pressure to be controlled.

6. Absolute pressure controlling apparatus in accordance with claim 5, wherein said liquid-displacing means carried by the movable part of said bellows comprises a hollow member having at least one contricted opening between the outside and inside thereof through which liquid may pass, said hollow member extending from the movable part of said bellows down into the liquid filling a portion of the interior of said bellows, but spaced from the walls of said bellows so as to permit of substantially non-rectilinear expansive movement of the movable part of said bellows without contact between said displacing means and any other relatively movable parts inside said bellows.

7. Absolute pressure controlling apparatus in accordance with claim 5, comprising a predetermined small amount of an inert gas within said bellows above the liquid therein, the amount of said liquid and the pressure of said gas being con-jointly predetermined so as to provide temperature compensation for the action of said valve as controllel by said bellows over a substantial range of temperaure so as to afford a control of the pressure to be maintained and controlled substantially independent of temperature changes in the apparatus throughout a substantial working range, said liquid also serving in conjunction with liquid-displacing means carried by the movable part of said bellows for dampening movements thereof.

8. Absolute pressure controlling apparatus in accordance with claim 5, wherein said liquid displacing means comprises a hollow substantially cylindrical member secured at its upper end to the underside of the movable part of said bellows and having a closed lower end, said member being of such length as to extend into the liquid within said bellows and being of substantially less outside diameter than the inside diameter of said bellows, at least one constricted opening between the inside and outside of said liquid-displacing member arranged below the normal level of the liquid within said bellows for the interchange of liquid between the inside and outside of said displacing member incident to movement of the movable part of said bellows, means for limiting the movements of the movable part of said bellows in both directions including means for limiting such movement in a valve closoing direction at substantially the point at which said valve will be closed, and an inert gas filling the remainder of the interior space within said bellows and present in such an amount and pressure as to effect substantially uniform temperature compensation for the apparatus over a predetermined working range of temperatures, and at least one aperture between the inside of said liquid displacing means and the outside thereof above the level of the liquid inside said bellows for the interchange of said gas between the inside and outside of said hollow liquid-displacing means.

9. Absolute pressure controlling apparatus, comprising means forming a substantially closed chamber for containing fluid pressure, the magnitude of which is to be controlled, fluid pressure conducting means for connection from the inside of said chamber to apparatus wherein pressure is to be controlled, fluid pressure conducting means for connection to a source of fluid pressure of greater absolute magnitude than the pressure to be controlled, a duct connected to the last named means and extending inside said chamber and provided with an orifice opening into the interior of said chamber, a flexible bellows disposed in the lower portion of said chamber and secured to the bottom portion thereof and arranged to have its upper portion movable vertically upon expansion and contraction of said bellows, a rigid structure built upon the upper portion of said bellows, self-aligning valve means carried by and resiliently associated with said rigid structure for cooperation with said orifice for throttling the flow therethrough, a helical tension spring having its lower end rigidly conected to said rigid structure, vertically adjustable guided means for controlling the position of the upper end of said spring, means accessible from the outside of said chamber for vertically adjusting the position of the upper end of said spring so as to control the tension thereof and thereby to control the pressure maintained by said apparatus, a predetermined amount of a liquid filling a part of the internal volume of said bellows, liquid-displacing means carried by the upper head of said bellows and extending therefrom into said liquid out of contact with the inside walls thereof for dampening the movements of said bellows, and a constantly open, constricted fluid pressure conducting means from the interior of said chamber for uninterrupted connection with a source of fluid pressure of less absolute magnitude than the pressure to be controlled.

10. Absolute pressure controlling apparatus for controlling and maintaining a predetermined sub-atmospheric air pressure, comprising means forming a substantially closed chamber for containing fluid pressure, the magnitude of which is to be controlled, fluid pressure conducting means for connection from the inside of said chamber to apparatus where a predetermined sub-atmospheric presesure is to be controlled, fluid pressure conducting means for connection with the atmosphere, a duct connected to the last named means and extending within said chamber and having an orifice therein opening into the interior of said chamber, substantially friction-free valve means associated with said orifice for throttling the flow of air therethrough into said chamber, a substantially evacuated flexible bellows subject externally to the absolute fluid pressure within said chamber and having a fixed part and a movable part, means responsive to movement of said movable part of said flexible bellows for controlling the throttling of said orifice by said valve means, and a constantly open, constricted fluid pressure conducting means from the inside of said chamber for uninterrupted connection to a source of sub-atmospheric pressure of less absolute magnitude than the predetermined pressure to be controlled.

11. Absolute pressure controlling apparatus, comprising means forming a substantially closed chamber for containing fluid pressure, the magnitude of which is to be controlled, fluid pressure conducting means for connection from the inside of said chamber to apparatus wherein pressure is to be controlled, fluid pressure conducting means for connection with a source of fluid pressure of greater absolute magnitude than the pressure to be controlled, a duct connected to the last named means within said chamber and having an orifice therein opening into the interior of said chamber, substantially friction-free valve means associated with said orifice for throttling the flow therethrough, a substantially evacuated flexible belows subject externally to the absolute fluid pressure within said chamber and having a fixed part and a movable part, an isoelastic spring opposing the action of the movable part of said flexible bellows in one direction and connected at one end to the movable part of said flexible bellows, means responsive to the movement of said movable part of said flexible bellows for controlling the throttling of said orifice by said valve means, and a constantly open, constricted fluid pressure conducting means from the interior of said chamber for uninterrupted connection with a source of fluid pressure of less absolute magnitude than the pressure to be controlled.

CHARLES F. WALLACE.
JOHN O. KIRWAN.

REFERENCES CITED

The following references are of record in the file of this patent:

UNITED STATES PATENTS

| Number | Name | Date |
|---|---|---|
| 1,172,596 | Heithecker | Feb. 22, 1916 |
| 1,174,661 | Boyd | Mar. 7, 1916 |
| 1,631,262 | Gourdou | June 7, 1927 |
| 2,115,512 | Vincent | Apr. 26, 1938 |
| 2,312,063 | Allen | Feb. 23, 1943 |
| 2,318,721 | Siver | May 11, 1943 |

FOREIGN PATENTS

| Number | Country | Date |
|---|---|---|
| 257,126 | Italy | Feb. 9, 1928 |
| 375,239 | Italy | June 23, 1939 |
| 455,290 | France | May 20, 1913 |
| 696,896 | France | Mar. 22, 1930 |